Dec. 2, 1924.  
W. C. REES  
LOCKED FASTENING  
Filed Aug. 5, 1922
1,518,119
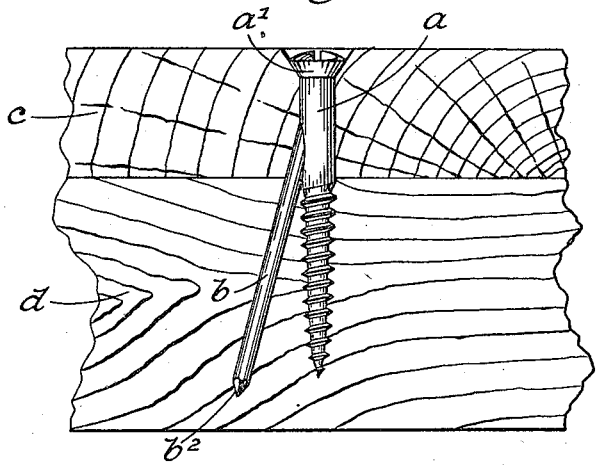
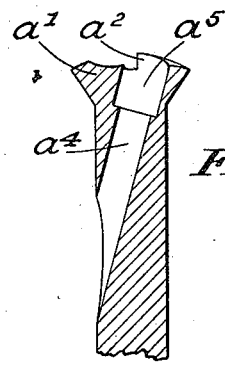
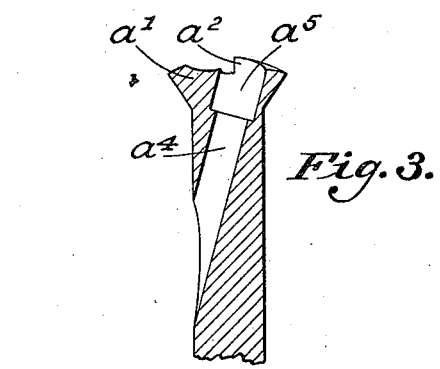
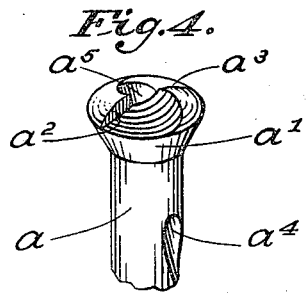
Inventor:  
W. C. Rees.  
By Wright, Brown, Quinby & May  
Attys.

Patented Dec. 2, 1924.

1,518,119

UNITED STATES PATENT OFFICE.

WARREN C. REES, OF SOMERVILLE, MASSACHUSETTS, ASSIGNOR TO ASEPTIC SERVICE COMPANY, OF BOSTON, MASSACHUSETTS, A CORPORATION OF MAINE.

LOCKED FASTENING.

Application filed August 5, 1922. Serial No. 579,864.

*To all whom it may concern:*

Be it known that I, WARREN C. REES, a citizen of the United States, residing at Somerville, in the county of Middlesex and State of Massachusetts, have invented new and useful Improvements in Locked Fastenings, of which the following is a specification.

The present invention relates to means for securing together the parts of a structure which are capable of being connected by inserted fastenings and are of such nature as to resist withdrawal of such fastenings. Among the structures and parts referred to are those made of wood, or including a wooden piece into which a fastening in the nature of a nail or a screw may be driven and wherein such fastening will be held by friction. My object is to furnish a fastening which will be secure against accidentally working loose and coming out of place as the result of vibration, or of swelling and shrinking due to changes of temperature and moisture content; and which cannot be withdrawn intentionally except with the practical destruction of the part in which it is secured.

A special object, secondary to the general object above stated, is to prevent theft of goods from packing cases in transit from shipper to consignee, by making it impossible to open such cases for the purpose of removal of their contents, except with such mutilation as to amount practically to destruction. This object is accomplished by the use of the fastening above referred to.

I have found that it is essential in order to obtain the best results, or even satisfactory results, in the full accomplishment of these objects, to make the fastening very closely according to principles which I have determined, and with special characteristics. A fastening made in accordance with such principles and having such characteristics, together with the combination of such a fastening with the parts which are fastened together by its use, form the subject of the present invention and are described in detail in the following specification with reference to the drawings.

In the drawings,—

Figure 1 shows in elevation a fastening embodying this invention combined with two members of a structure which are united by its use, such structure being shown in section.

Figure 2 is an end view of the fastening with the locking member thereof partially in place.

Figure 3 is a fragmentary sectional view of the main element of the fastening, showing the head end of such element.

Figure 4 is a perspective view of the same part shown in Figure 3.

Like reference characters designate the same parts in all the figures wherever they occur.

The fastening consists of two elements, namely, a main fastener $a$ and a locking member $b$, which is also an auxiliary fastener. The main member is preferably a screw and when designed for use with wooden pieces, preferably has the characteristics of a wood screw. However, it may be of other forms, as that of a nail or spike, provided that its shank at one end has sufficient thickness to contain a passage for the locking member.

When the main member is made as a screw, it has a head $a'$ with shoulders $a^2$ and $a^3$ at opposite sides of its axis to receive driving torque from a screw driver. These shoulders face oppositely to one another so as to receive the thrust applied by opposite sides of the screw-driver blade. Between the shoulders the end face of the screw head is beveled or inclined in order that there may be no abutments on which the screw driver may apply force when turned in the retracting direction.

The end of the member $a$ on which the head $a'$ is formed may be called for convenience the head end; and the same term may be applied descriptively to identify the corresponding end of any other equivalent fastening member, even though it has no enlarged head, whether such equivalent member be a screw of any sort, a nail, a spike, or anything else suitable for the purpose.

An inclined passage $a^4$ is formed in the shank of the member $a$, one end of such passage opening through the end face of the member, and the opposite end of the passage opening through the side of the member. That end of the passage which opens in the end face of the fastening is countersunk or enlarged to provide a chamber $a^5$ capable of receiving and enclosing the head of the locking member $b$.

Said member $b$ is essentially a straight rod of a diameter approximating, or slightly smaller than, that of the passage $a^4$, whereby it may be passed freely through such passage and will substantially fill the same. On one end it has a head $b'$, the length and diameter of which are such that it will pass into the chamber $a^5$ and be enclosed by the walls thereof. In other words, the head of the locking member substantially fills the recess $a^5$, but does not project therefrom when driven home. The opposite end $b^2$ of the locking member is preferably pointed in order that it may be driven through a piece of wood or like material by blows applied upon its head.

The use of the fastening thus described is illustrated in Figure 1, where $c$ and $d$ represent two pieces of a structure which are fastened together. Both these pieces are here represented as being made of wood, but that is not to be construed as a limitation of the protection which I claim for this invention. These pieces may represent specifically the cover and side of a packing case, or any two walls of such case capable of being connected by nails or screws, or parts of any other structure whatever in which fastenings of the sort here shown may be inserted and held by frictional contact with the enveloping material.

In putting the fastening to use, the main member $a$ is first inserted, either into a hole already prepared for it, or by being driven so that it forms its own receiving hole. It is preferably driven so deep that its head end is below the outer surface of the part $c$.

After the member $a$ has thus been put in place, the locking member is inserted, being preferably driven without previous preparation of the hole to receive it in the connected parts. It is thus driven until its head has passed into the socket $a^5$.

Both members are made of material which combines the qualities of toughness to resist fracture by a hammer blow, and hardness to oppose bending. These qualities are obtained by making the members of mild steel and case hardening them, or hardening them throughout.

Another important characteristic is the angle which the locking member makes with the main member. This angle is approximately twelve degrees and has been proved to be the angle at which the locking member is most efficient to resist rotation of the main member or its direct withdrawal. Some variation from the exact value of this angle as above stated is permissible, but any great variation will impair the efficiency of the lock.

It will be evident that after the main fastener has been placed, the locking member may be driven through it by blows of a hammer, and that as the passage through which the locking member goes is straight, no deformation of this member takes place, wherefore the only resistance to its insertion is that of the material which it penetrates, and, what is more important, it may therefore be made of material which is so hard and rigid that it cannot be bent without excessive difficulty. The thickness and length of the locking member are preferably in about the proportions to the thickness and length respectively of the main member shown in the drawing. That is, the locking member is about half as large in diameter as the end part adjacent to the head, of the main member, and it is approximately as long as the main member. It is shown in the drawing as slightly longer than the main member, but it may be either slightly shorter or slightly longer in proportion than shown. These proportions, together with the angle which the locking member makes with the main member, and its rigidity, afford the maximum resistance to withdrawal of the combined fastening. The locking member will neither wrap around the main member if the latter is turned in the attempt to unscrew it, nor will it bend if a direct outward pull is applied to the main member, nor will it cut a groove in soft wood if attempt is made to rotate the main member or to withdraw it by a direct pull. On the contrary if force is applied by any means sufficient to budge the fastening no distortion of the locking member will take place, but instead it will splinter and break the wood.

The locked fastening made and assembled as described cannot be withdrawn, or the pieces which it unites separated, without practical destruction of the connected parts, or their mutilation to such a degree as to show at once that an attempt to disturb the structure has been made. As applied to packing cases containing goods, this is a practical assurance against theft of the goods. In the case of other structures their accidental falling apart as the result of vibration, weather conditions or what not is substantially prevented.

The enveloping of the head of the locking member in the head of the main member prevents the locking member from being grasped and withdrawn by itself, and the hardness of the main member prevents its head from being cut away far enough to permit of a grip being taken on the locking member by a tool. The toughness of the members prevents them from being fractured and their stiffness prevents the locking member from being bent and brought so close to the main member as to permit withdrawal of the assembled members as a unit by sufficiently powerful force applied either to rotate or withdraw the main member.

Another useful feature resides in the relation of the driving abutments to the plane of the passage $a^4$. These abutments are on opposite sides of and parallel to a diameter of the head, and the passage $a^4$ is preferably located in a radial plane of the fastening which is perpendicular to said diameter. Hence the location of the shoulders after the main fastening has been set serves as an index to indicate the plane in which the locking fastener will be driven. When the fastening is inserted in a narrow piece, as through the cover into the wall of a packing case, this relation enables the workman to drive the locking device with assurance that it will be entirely embedded in the wood and will not protrude from the side of the piece into which it is driven. Such protrusion would, of course, defeat the object of the lock as a means for preventing undetected malicious withdrawal of the fastening. Means for the same end equivalent to that just described which consists in any other definite and understood relation between the radial plane of the passage and the driving shoulders may be provided. Thus, instead of these elements being at right angles to each other, they may coincide, or be at some other predetermined known angle.

What I claim and desire to secure by Letters Patent is:

1. A fastening comprising a main member having a straight inclined passage from one end to one side thereof, and having a socket or recess in said end about the opening of the passage, and a straight locking member adapted to be driven through said passage, the locking member being provided with a head which is adapted to be completely and closely surrounded by the wall of the socket or recess in the end of the main member.

2. A fastening comprising a screw having a straight inclined passage from its head to one side, the end of said passage within the head being surrounded by a recess or socket, a straight locking member adapted to be driven through and substantially fill such passage, said locking member having at its outer end a head which is adapted to be completely and closely surrounded by the wall of the socket in the screw head whereby it cannot be engaged to withdraw the locking member when the fastening is in use.

3. A fastening comprising a main member having a straight inclined passage opening through one end and through its side, and a locking member of approximately equal length with the main member extending through said passageway.

In testimony whereof I have affixed my signature.

WARREN C. REES.